A. OLSEN.
MOTOR VEHICLE COVER.
APPLICATION FILED JUNE 30, 1917.
1,331,122.
Patented Feb. 17, 1920.
3 SHEETS—SHEET 1.
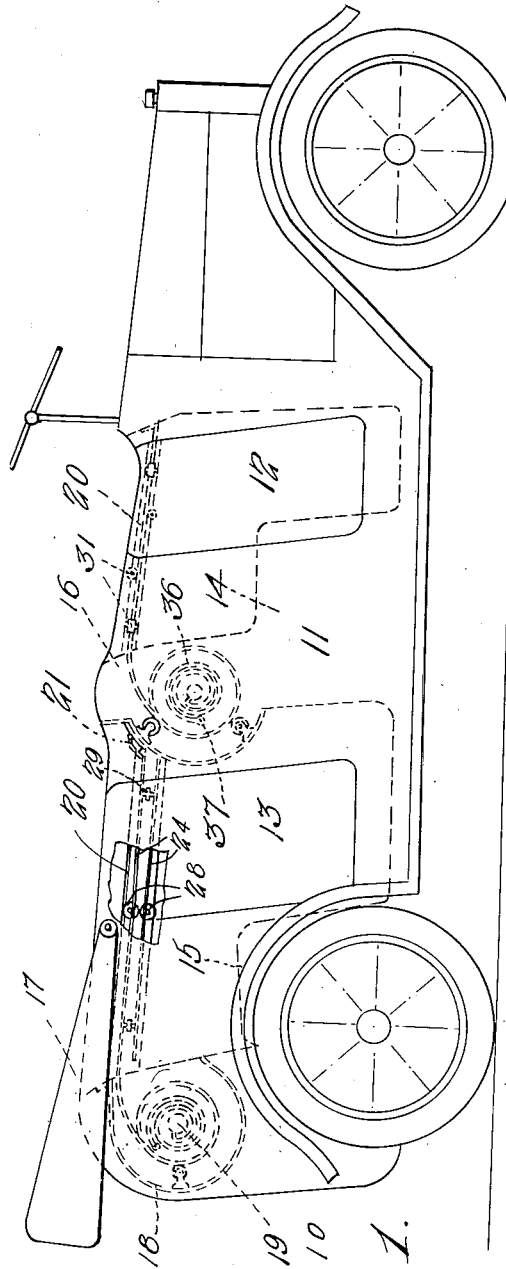
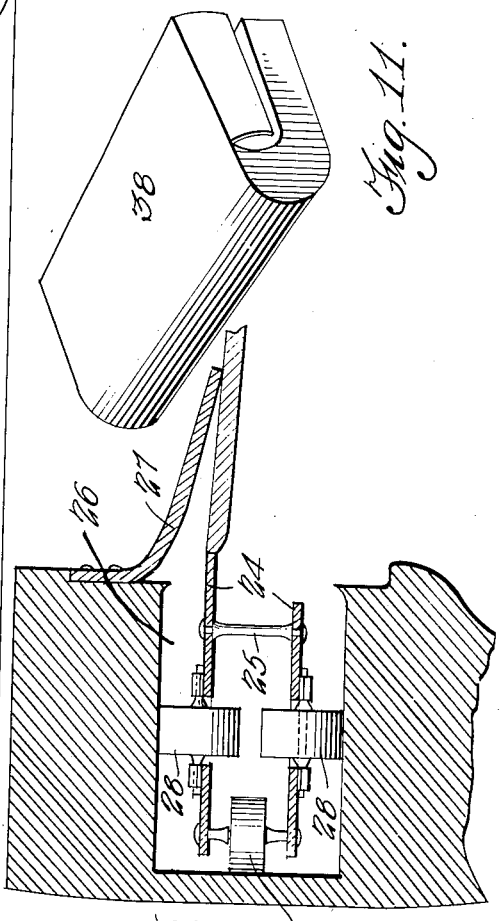
Witnesses
Inventor
AXEL OLSEN

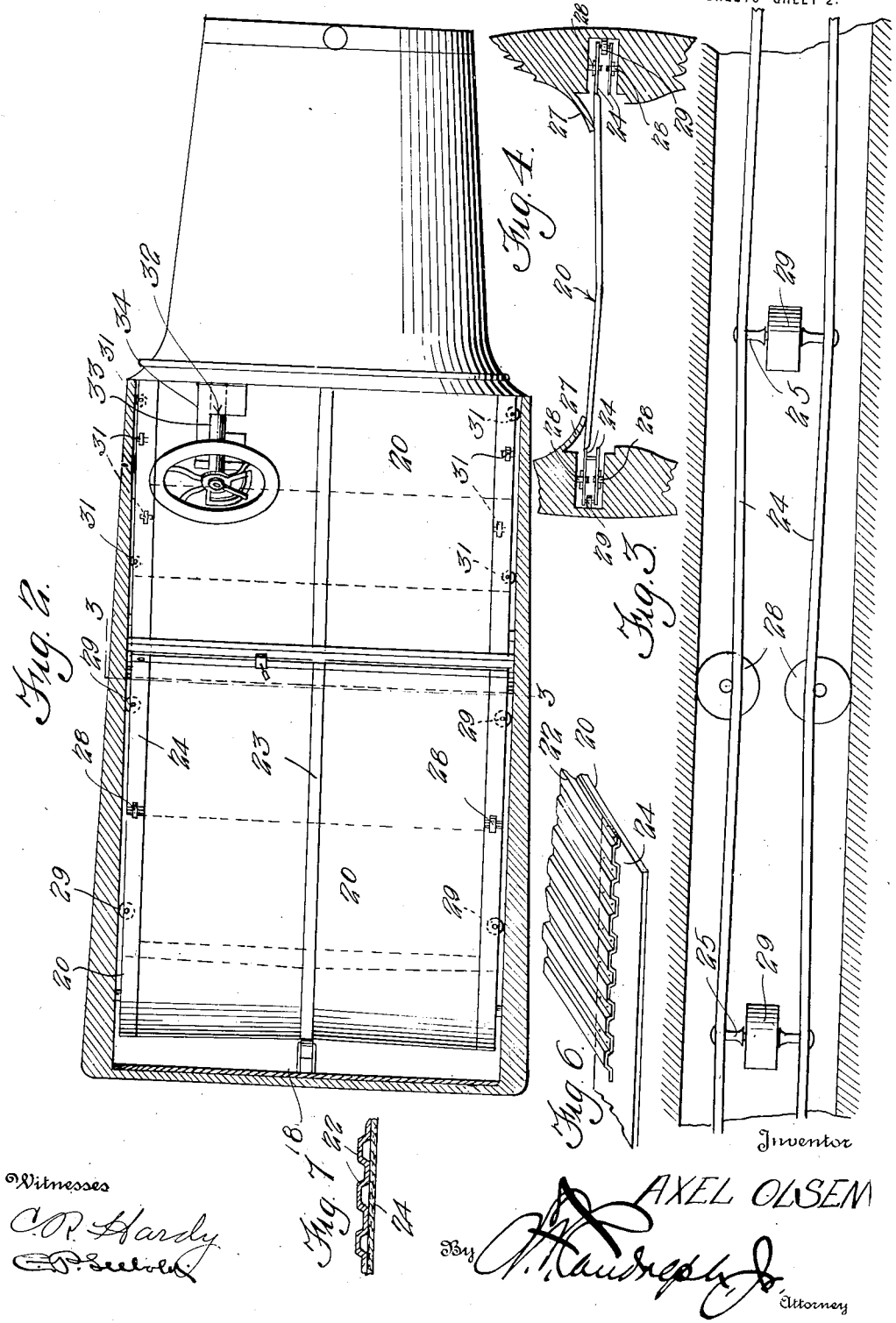

A. OLSEN.
MOTOR VEHICLE COVER.
APPLICATION FILED JUNE 30, 1917.

1,331,122.

Patented Feb. 17, 1920.
3 SHEETS—SHEET 3.

Witnesses
C. P. Hardy
C. P. [illegible]

Inventor
AXEL OLSEN
By [signature]
Attorney

UNITED STATES PATENT OFFICE.

AXEL OLSEN, OF MENDOZA, ARGENTINA.

MOTOR-VEHICLE COVER.

1,331,122.　　　　Specification of Letters Patent.　　Patented Feb. 17, 1920.

Application filed June 30, 1917. Serial No. 177,884.

*To all whom it may concern:*

Be it known that I, AXEL OLSEN, a citizen of Denmark, residing at Mendoza, Argentina, have invented certain new and useful Improvements in Motor-Vehicle Covers; and I do hereby declare the following to be a full, clear, and exact description of the invention, such as will enable others skilled in the art to which it appertains to make and use the same.

This invention has for its object to provide a conveniently operable cover particularly designed for use in connection with touring cars and roadsters for effectively protecting the seats and interior of the motor vehicle when not in use.

Another object is the provision of means for supporting the cover in inoperative position in the backs of the seats.

Figure 10:
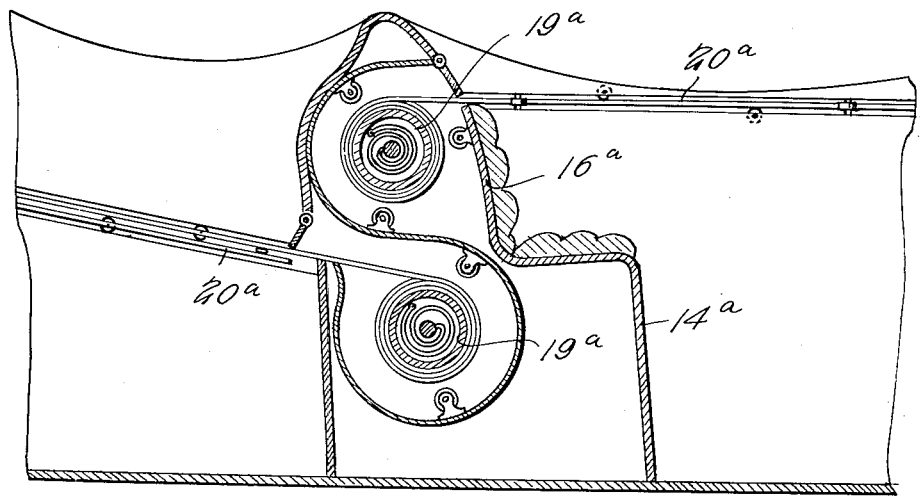
Figure 6:
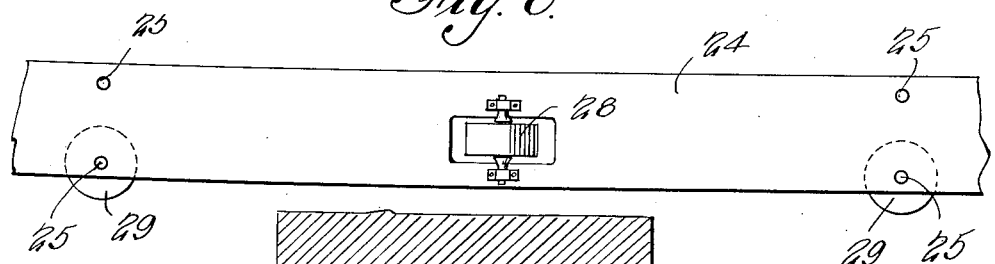
Figure 9:
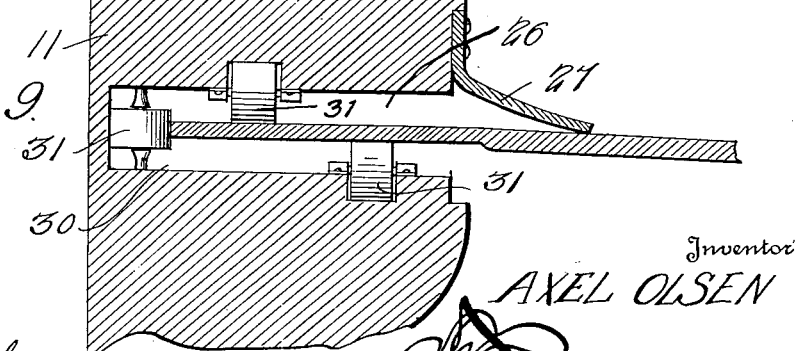

With these and other objects in view, the invention consists in the novel construction, combination, and arrangement of parts as will be hereinafter specifically described, claimed and illustrated in the accompanying drawings, in which:

Figure 1 represents a side elevation of a motor vehicle, illustrating the invention applied to use, Fig. 2 represents a plan view of the vehicle, partly in section, Fig. 3 represents a fragmentary longitudinal sectional view on the line 3—3 of Fig. 2, Fig. 4 represents a fragmentary transverse sectional view through the motor vehicle, Fig. 5 represents an enlarged sectional view on the plane of Fig. 4, Fig. 6 represents a fragmentary perspective view of the cover, Fig. 7 represents a detail sectional view through the cover, Fig. 8 represents a fragmentary plan view of one of the supporting strips for the cover, Fig. 9 represents a fragmentary sectional view through the side of the motor vehicle, illustrating a modification of the invention, Fig. 10 represents a fragmentary longitudinal sectional view through a modified form of the invention, Fig. 11 represents a fragmentary perspective of the binding strip used in connection with the modification of the invention illustrated in Fig. 10.

Referring to the drawings in detail, wherein similar reference numerals designate corresponding parts throughout the several views, the numeral 10 indicates generally a well known type of touring car including a body 11, having front and rear doors 12 and 13, and front and rear seats 14 and 15, respectively, provided with the backs 16 and 17.

In applying the invention to use, the front and rear seat backs 16 and 17 are each provided with shaft-receiving housings 18, in which are rotatably supported the winding shafts 19. A flexible protective covering, designated generally by the numeral 20 is secured to each of the shafts 19, and is movable forwardly through a slot formed in the front portion of the back to the position shown in Fig. 1. The protective covering associated with the rear seat is adapted when extended, or moved forwardly, to engage the back of the front seat 14, and is secured in position by a turn button or other fastening device 21, while the protective covering associated with the front seat is adapted, when extended, or moved forwardly, to engage and be secured to the dashboard of the motor vehicle.

The rear cover 20 is constructed of corrugated metal or other flexible material 22, which is reinforced centrally by the center strip 23, and is connected at its longitudinal edges with spaced parallel side strips 24, which are secured in spaced relation by the spacing bars 25. The sides and rear doors 13 of the vehicle body are provided with horizontal channels 26 into which the longitudinal edge portions of the cover project, and a flexible closure flap 27 is secured to the inner surface of the vehicle body and doors above the channel 26, and is adapted, when the cover is wound upon the shaft 19, to cover the channel and prevent dust and dirt entering.

As will be noted more clearly from Figs. 2 and 4, the flexible covering 20 is inclined transversely from each edge toward the central reinforcing strip 23, and, due to this inclination, acts to direct moisture toward the strip, this strip being inclined downwardly and forwardly to accord with the downward and forward inclination of the guide channels 26. By this arrangement, moisture which falls upon the cover is directed away from the lateral edges thereof, this moisture being caused to flow longitudinally of the cover toward the front of the vehicle, it being understood that any suitable means such as a discharge opening or drain tube may be provided for receiving the drainage from the forward edge of the cover at the central portion thereof and directing the same away from the automobile. In this connection, it is to be noted that the downwardly and inwardly inclined flaps 27 at each side of the vehicle body, in addition to preventing entry of dust and foreign materials into the channels 26, also serve to direct moisture which collects thereon downwardly and inwardly onto the upper surface of the cover thus effectually preventing entry of this moisture into the channels and about the inner edges of the cover into the interior of the body of the automobile. Where a cover of corrugated construction such as that illustrated in Fig. 6 is employed, the alternate channels which extent transversely of this cover materially assist in draining moisture toward the central reinforcing strip 23 for the purpose stated.

The upper and lower side strips 24 at each edge of the cover are provided with a pair of superposed friction reducing rollers 28, which engage the top and bottom walls of the channel, and are designed to permit free movement of the cover. A friction reducing roller 29 is rotatably supported upon one of the spacing bars 25 intermediate the pairs of rollers 28, and is arranged at right angles to the latter, or in engagement with the outer wall of the channel 26 to further insure free movement of the cover.

The front cover 20 is constructed similarly to the rear cover except that one of the side strips 24 is eliminated, together with the connecting bars 25, and the protective cover is adapted to move in a longitudinal groove formed in the sides and front doors 12. Friction reducing rollers 31 are arranged in the groove or channel 30, and engage the side strips 24 of the cover to insure free movement thereof. The front edge of the front cover 20 is provided with a slot 32 to accommodate the steering post 33 and the steering gear of the motor vehicle, and a slidable cover 34 is arranged over the slot and is adapted to be moved thereover after the cover 20 has been moved into operative position to insure against entrance of rain or dirt through the slot 32. Each of the winding shafts 19 is connected with one terminal of a coil spring 36, the opposite end of which is secured to a post 37, which is secured to the wall of the opening 18, whereby the tension of the springs normally tends to rotate the shaft in a direction to wind the cover thereon. It will be understood that the front and rear covers are secured in extended or operative position, when desired, to protect the interior of the motor vehicle by the turn buttons 21.

In the modifications of the invention illustrated in Figs. 10 and 11 the numeral 16ª indicates the back of the front seat 14ª of the motor vehicle, which is of hollow construction and accommodates the winding shafts 19ª for both front and rear covers 20ª. This form of the invention is identically the same as the form above described, except that the supporting shaft for the rear cover 20ª is arranged in the front seat of the motor vehicle, and consequently in order to extend or move the cover to operative position it is drawn rearwardly toward the occupants of the rear seat. In this form of the invention it is evident that the rear cover may be drawn rearwardly over the occupants of the rear seat, providing a protection therefor. A binding strip 38 is secured to the rear edge of the rear cover 20 to provide a hand grip by which the cover may be held in position over the occupants of the rear seat.

What I claim is:

1. The combination with a vehicle body including a seat arranged therein, of a housing positioned adjacent said seat, a winding shaft mounted in said housing, the side walls of said body being provided in their inner faces with guide channels inclined longitudinally thereof, and a flexible covering windable upon said shaft having its edge portions operable in said channels, the covering being adapted when extended to form a protecting member for the interior of the body of the vehicle and for said seat, said cover being inclined downwardly and inwardly from each edge toward its center so as to direct moisture falling thereon away from said channel, this moisture draining from the lower end of the cover.

2. The combination with a vehicle body including a seat, of a housing arranged adjacent said seat, a winding shaft mounted in said housing, the body being provided with longitudinally inclined grooves in the inner face of each side thereof, a flexible covering windable upon said shaft and having its lateral edge portions operable in the channels, the covering when extended forming a projecting member extending above said seat and the lower portion of the interior of the body, the cover being inclined downwardly and rearwardly from each side so as to direct moisture falling thereon toward the central portion of said cover, and flexible flaps for normally closing said channels, the flaps being inclined downwardly and inwardly with their lower edges resting upon the upper face of said cover when the cover is extended so as to direct moisture falling thereon away from the said channels.

3. The combination with a vehicle body including a seat, of a housing mounted adjacent said seat, a winding shaft mounted in said housing, the body being provided with a longitudinally extending channel in the inner face of each side thereof, the channels being inclined downwardly away from the seat, and a transversely corrugated flexible covering windable upon said shaft and having its edge portions operable in said channels, the cover being inclined downwardly from each edge toward the center thereof so as to direct moisture to the center of the cover, this moisture being drained from the cover at the central portion of the lower end thereof.

4. The combination with a vehicle body including a seat, of a housing positioned adjacent said seat, a winding shaft mounted in said housing, said seat body being provided with longitudinally extending channels formed in the inner face of each side thereof and inclined downwardly away from the seat, a flexible covering windable upon said shaft and having its edge portions operable in said channels, and spaced sets of anti-friction rollers operable in said channels and providing anti-friction mountings for guiding and supporting the edge portions of the cover.

5. The combination with a vehicle body including a seat, of a housing arranged adjacent said seat, a winding shaft mounted therein, a flexible covering windable on said shaft and adapted when extended to form a cover for the seat and the interior of the vehicle body, and a plurality of inwardly directed guide rollers mounted upon the inner face of said housing and acting to engage said cover when being wound upon the shaft so as to insure accurate winding thereof.

6. The combination with a vehicle body including a seat of hollow construction, of a housing mounted in said seat, said housing being formed from a single sheet of material bent into substantial S-shape in cross section to provide upper and lower shaft receiving compartments, said compartments being provided with oppositely directed outlet openings, winding shafts mounted in said compartments, and flexible covers windable upon said shafts and operable through the openings of the housing adapted, when extended, to form protective coverings for the forward and rearward portions of the interior of the vehicle body and for the seats carried thereby.

7. The combination with a vehicle body including a seat, of a housing arranged adjacent said seat, a winding shaft mounted therein, said body having longitudinally extending channels formed in its inner face of each side, a flexible covering windable on said shaft, rollers mounted in each of said channels for forming antifriction connections between the longitudinal edges of said flexible covering, and the walls of said channels, and flexible flaps carried by said body adjacent said channels for engagement with said flexible covering when the covering is extended to close said channels and direct moisture falling on said flaps toward the longitudinal center of said flexible covering.

8. The combination with a vehicle body including a seat, of a housing positioned adjacent said seat, a winding shaft mounted in said housing, said body being provided in the inner face of its side portions with longitudinal channels in which are located roller bearings, rollers mounted in said bearings and arranged adjacent each wall of said channels, a flexible covering windable on said shaft with its longitudinal edges riding between the rollers in said channels when the flexible covering is extended and rewound upon said shaft, said rollers contacting with all faces of the flexible covering riding therebetween to guide the flexible cover and retain the latter in position, and flexible flaps carried by said vehicle body and having free longitudinal edges resting upon the outer face of said flexible covering to close said channels and direct moisture falling on said flaps toward the longitudinal center of said flexible covering.

9. The combination with a vehicle body including a seat, of a housing arranged adjacent said seat, a winding shaft mounted in said housing, a flexible covering windable on said shaft and adapted to be extended over said seat, side straps carried along the longitudinal edges of said flexible covering, said body having inclined longitudinal channels formed in the inner face of the sides thereof, said side straps extending into said channels, horizontal and vertical mounted bearing rollers carried by said side straps and contacting with the walls of said channels to support said flexible covering and guide the same over said seat, and flexible flaps carried by said body and inclined downwardly with their free longitudinal edges resting upon said flexible covering to close said channels and direct moisture falling on said flaps toward the longitudinal center of said flexible covering.

10. The combination with a vehicle body including a seat, of a housing mounted in said seat, said housing being of substantially S-shape in cross section to provide upper and lower shaft receiving compartments, said compartments being provided with oppositely directed outlet openings, shafts mounted in said compartments, flexible covers windable upon said shafts and operable through the openings thereof, said flexible covers being adapted when extended to form protective coverings for the forward and rearward portions of the interior of the vehicle body and for the seats carried thereby, means for supporting and guiding the edges of said flexible covers, and a binding strip for the free edge of one of said flexible covers.

In testimony whereof I affix my signature in presence of two witnesses.

AXEL OLSEN.

Witnesses:
D. A. SMALL,
U. C. MIRL.